(12) United States Patent
Halim et al.

(10) Patent No.: US 12,164,363 B2
(45) Date of Patent: Dec. 10, 2024

(54) OPERATIONAL CHANGE CONTROL ACTION

(71) Applicant: Hewlett-Packard Development Company, L.P., Spring, TX (US)

(72) Inventors: Irwan Halim, Spring, TX (US); Khoa Huynh, Spring, TX (US); Christoph Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/006,852

(22) PCT Filed: Jul. 31, 2020

(86) PCT No.: PCT/US2020/044577
§ 371 (c)(1),
(2) Date: Jan. 25, 2023

(87) PCT Pub. No.: WO2022/025927
PCT Pub. Date: Feb. 3, 2022

(65) Prior Publication Data
US 2023/0273670 A1    Aug. 31, 2023

(51) Int. Cl.
*G06F 1/26* (2006.01)
*G06F 1/32* (2019.01)
*G06F 1/3296* (2019.01)

(52) U.S. Cl.
CPC .................... *G06F 1/3296* (2013.01)

(58) Field of Classification Search
None
See application file for complete search history.

(56) References Cited

U.S. PATENT DOCUMENTS

| | | |
|---|---|---|
| 6,654,896 B1 | 11/2003 | Saunders et al. |
| 6,760,850 B1 | 7/2004 | Atkinson et al. |
| 9,043,657 B2 | 5/2015 | Notohardjono et al. |
| 9,110,805 B1 | 8/2015 | Tsai |
| 9,830,226 B2 | 11/2017 | Teshome et al. |
| 10,409,585 B2 | 9/2019 | Troia et al. |
| 10,488,906 B2 | 11/2019 | Sultenfuss et al. |
| 2005/0071665 A1 | 3/2005 | Zimmer et al. |
| 2006/0152381 A1 | 7/2006 | Yang et al. |
| 2011/0154065 A1 | 6/2011 | Rothman et al. |
| 2011/0264942 A1 | 10/2011 | Tsukamoto |
| 2012/0005632 A1 | 1/2012 | Broyles, III et al. |

(Continued)

FOREIGN PATENT DOCUMENTS

| | | |
|---|---|---|
| KR | 10-1245442 B1 | 3/2013 |
| WO | 2019/129022 A1 | 7/2019 |

*Primary Examiner* — Nitin C Patel
(74) *Attorney, Agent, or Firm* — Quarles & Brady LLP (57) ABSTRACT

According to aspects of the present disclosure, a system, method, and storage medium comprising a plurality of sensors communicatively coupled to a microcontrol unit (MCU) wherein the MCU controls the transition between operational states. The MCU receives a system-related datum from one of the plurality of sensors. The MCU determines a control action based on the system-related datum. The MCU executes the control action on the system. The MCU sends a state change datum to a firmware wherein the state change datum indicates an operational change of the system based on the control action.

17 Claims, 5 Drawing Sheets

(56) References Cited

U.S. PATENT DOCUMENTS

| | | |
|---|---|---|
| 2012/0249768 A1* | 10/2012 | Binder .................... G09G 5/10 |
| | | 348/E7.085 |
| 2013/0166092 A1 | 6/2013 | Wang |
| 2015/0082063 A1 | 3/2015 | Peterson et al. |
| 2018/0232023 A1* | 8/2018 | Culbert .................... G06F 1/10 |
| 2019/0123588 A1 | 4/2019 | Kim et al. |
| 2020/0045519 A1 | 2/2020 | Raleigh et al. |
| 2020/0348745 A1 | 11/2020 | Hamlin et al. |
| 2020/0409443 A1 | 12/2020 | Seto |
| 2021/0271304 A1 | 9/2021 | Chang et al. |

\* cited by examiner

OPERATIONAL CHANGE CONTROL ACTION

BACKGROUND

Computing systems function in different operational states. Operational states correspond to different functionality available and the behavior of the computing system within those states.

DETAILED DESCRIPTION

Power states refer to the Advanced Configuration and Power Interface (ACPI) specification. Power state control is used to allow further power management by the I/O, CPU, and Sleep Power. In some implementations there may six states (S0-S5) corresponding to different levels of functionality of a host system. S0 is a working state. S0 is the power state when a computer is functioning as expected. Input/Output (I/O) power states and central processing unit (CPU) power states are being managed dynamically. In this state all power rails are active.

S1, S2, S3, and S4 are sleep states. S1-S4 are a series of sub states which allow various amounts of latency to be obtained before restoring the host system back to S0. Some power rails are on but not all of them. S1-S4 may store operating system (OS) state to non-volatile memory to restore system state in the event the system moves back to S0 state.

S5 is a soft off state. S5 is the state where the host system appears to be off. However, standby power is available, but all other power is removed. S5 state maintains no volatile memory configurations so the OS may be reloaded.

Operating states refer to a mode in which a host system is configured and has successfully booted into. For purposes of this disclosure, operating states correspond to a host system state where the firmware has bootstrapped the operating system and the operating system is managing the resources. An operational state change corresponds to a change in how the firmware and the operating system present the host system.

Host systems are subject to the environments in which they operate. In some instances, external factors may physically compromise the host system to where the host system may not be able to operate safely. In another instances, a host system may be accessible in a less secure physical environment. As disclosed herein, a host system may be equipped with a plurality of sensors and a micro-control unit (MCU). The MCU may receive system-related datum from the sensors, determine a control action based on the datum, and execute the control action. In another implementation, the sensors may detect excessive heat and humidity, which can lead to degraded physical connections between components within the host system. In this implementation, the sensors may send a system-related datum to the MCU detecting temperature and humidity. The MCU may determine whether the combination of heat and humidity readings, as received in the datum, constitute a risk to the components of the host system. The MCU may create and execute a control action based on the determination, where the control action may be to block power state change. In another implementation, the host system may be physically exposed to a variety of peripherals. The MCU in an S5 system state may receive a system-related datum from a communications port. The MCU may disable the communication port based on the datum. In this implementation, the datum may correspond to a vendor identification field or a product identification field of a peripheral device. The MCU may determine a control action based on comparing the datum to a whitelist or blacklist of peripherals. The MCU may enable the host system to enter a different power state based on the control action.

Figure 1:
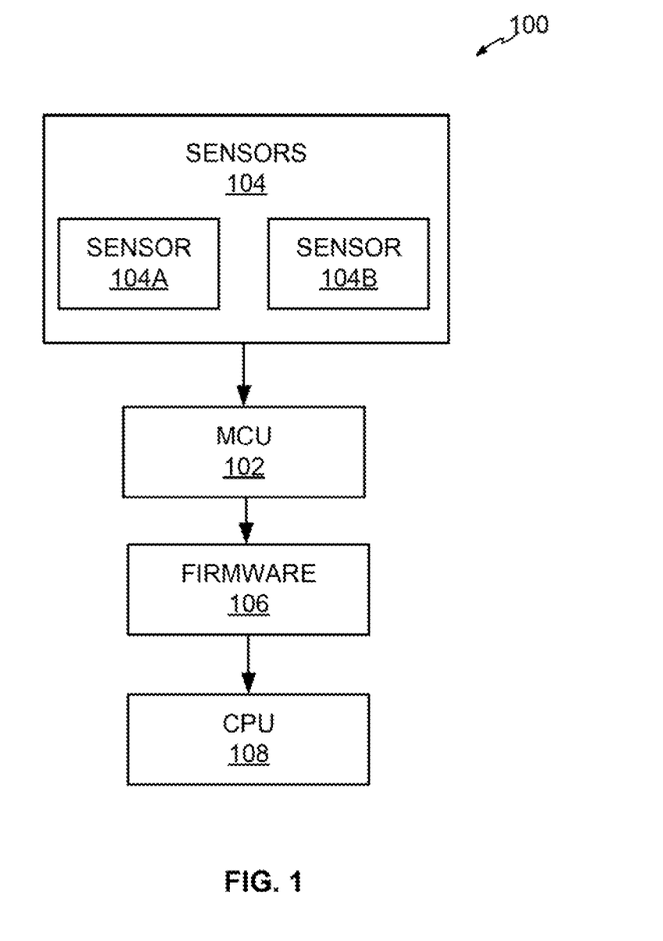
FIG. 1 illustrates control system, according to an example.

FIG. 1 illustrates control system 100, according to an example. The control system 100 may include a micro-control unit (MCU) 102, a plurality of sensors 104, firmware 105, and a central processing unit (CPU) 108.

The MCU 102 may correspond to an embedded circuit within the system 100. The MCU 102 may be embedded inside of the system 100 to control power states in the host system. The MCU 102 may receive and interpret system-related data received from sensors 104. The MCU 102 may use peripherals to communicate and enact the appropriate action. The MCU 102 may be communicatively coupled to the firmware 106. Likewise, the MCU 102 may be communicatively coupled to the sensors 104. In one implementation, the MCU 102 may be electrically coupled to the sensors 104 and may regulate power distribution to the sensors. The MCU 102 may be attached to a system bus (not shown) to facilitate communication between sensors 104 and firmware 106. Additionally, the MCU 102 may be able to access system memory (not shown) through a system bus, as well as storage subsystems (not shown).

The sensors 104 provide inputs to the MCU 102 based on conditions relative to the host system. The sensors 104 may include sensors of different functions such as sensor 104A and sensor 104B. In one implementation sensor 104A may be a temperature sensor such as a thermocouple or a thermistor. Sensor 104B may be a humidity sensor configured to detect and report dew point, absolute humidity, and relative humidity. In another implementation 104, the sensors 104 may be specialized sensor-enabled peripheral ports configured to operate in S5 power state. In some implementations, a universal serial bus (USB) port may be configured to be electrically active during S5 power state. In this implementation, the specialized communication port may provide the MCU 102 with information relating to the vendor identification field (VID) and the product identification field (PID) corresponding to the peripheral. The MCU 102 may receive the VID and PID and execute instructions to determine a control action based on the VID and PID. In another implementation, the sensors 104 may include geo-locational receivers. For example, sensors 104 may include a global positioning system (GPS) receiver. Additionally, the sensors 104 may be biometric sensors including fingerprint scanners with on-chip authentication.

In another implementation, the sensors 104 may take the form of software-based sensors. Software-based sensors may be implemented as agent software that executes on top of an operating system within the system 100. Agent software may be a software application that monitors the state of the host system via software interfaces. The agent software may detect logical problems or effects within the host system. The software-based sensors may sense and report system errors to a non-volatile memory, such as flash memory or mechanical hard disk drives that are accessible by the MCU 102 in an S5 power state.

A firmware 106 implements basic I/O bootstrapping functionality for a host system. In some implementations the firmware 106 may be implemented as a Basic Input/Output System (BIOS). In other implementations, the firmware 106 may be implemented system firmware implemented utilizing a Unified Extensible Firmware Interface (UEFI). The firmware 106 provides basic hardware initialization when the host system exits S5 power state. The firmware 106 loads low level device drivers for associated host system hardware and initializes the host system for OS handover. In the system 100, the firmware 106 may be communicatively coupled with the MCU 102. The firmware 106 may be electrically coupled with the host central processing unit (CPU) 108. The CPU 108 executes the OS and associated applications for the system 100, as well as hosting any software-based sensors or system agents within the host system. The CPU 108 may be a general-purpose processor commonly found in personal computing devices, mobile computing devices, and computing servers.

A firmware 106 may also be utilized by the MCU 102 to adapt the control system 100 to another purpose. For example, a power state or operational change, action may be sent by the MCU 102 to the firmware to change a power or operational feature of the host system.

Figure 2:
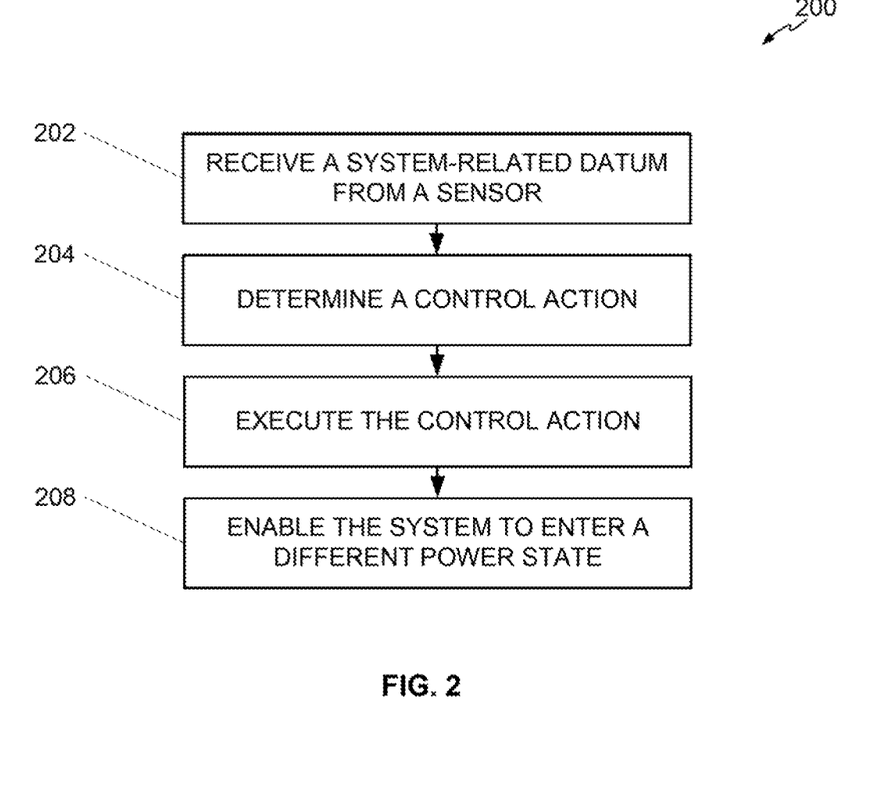
FIG. 2 is a block diagram corresponding to a method for controlling S5 power state, according to an example.

FIG. 2 is a block diagram 200 corresponding to a method for controlling S5 power state, according to an example. References to features of FIG. 1 may be utilized to more effectively describe the block diagram 200. FIG. 2 describes a process by which the MCU 102 detects certain potentially harmful conditions while in S5 power state and makes efforts to remediate them and limit the host system to less than S5 power state.

The MCU 102 may receive a system-related datum from a sensor while a host system corresponding to the system-related datum is in an S5 power state at block 202. System-related datum may be information corresponding to the host system recorded from one of the sensors 104. The system-related datum may correspond to a physical or logical impact on the host system. A physical impact may deal with a physical aspect of the host system. A logical impact may deal with a logical or abstract aspect of the host system. A logical impact may include high temperatures internal to the host system. For example, a logical impact may include a software error. In one implementation, the plurality of sensors may include temperature and humidity sensors. The system-related datum may correspond to a measured or measurable condition affecting the system 100. In high heat and humidity environments, the powering of the host system may not be guaranteed to be safe to either the host system or potentially the user. The MCU 102 may poll the sensors 104 for a system-related datum. In another implementation, the MCU 102 may utilize an event notification system at the sensors 104. The system-related datum may correspond to a digital representation of a condition affecting the system 100 as measured by the sensor. A condition affecting the system 100 may include but is not limited to atmospheric conditions. A condition affecting the system 100 may include unapproved peripherals interfacing with the system 100, such as but not limited to a non-whitelisted universal serial bus (USB) peripheral.

The MCU 102 determines a control action at block 204. The control action may be determined based on the system-related datum received. Following a previously introduced implementation, the MCU 102 may receive a system-related datum from a humidity sensor. The humidity sensor may indicate a high humidity environment. A corresponding control action may include disabling power of the host system. The MCU 102 may switch an electrical connection between the power subsystem to the firmware, where the firmware cannot execute and bootstrap the operating system.

In another implementation, the control action may include scanning a memory of the host system. The MCU 102 may be communicably coupled to the host system memory, where the MCU 102 may be able to examine memory cells. The MCU 102 may be able to pattern match memory patterns consistent with viral infections.

Additionally, the control action may include scanning a storage medium of the host system. Similar to the memory pattern matching, the MCU 102 may scan a non-volatile storage subsystem such as a hard disk drive or solid-state disk drive. The MCU 102 may be able to identify suspicious boot record manipulations, as well as other virus signatures. In one implementation, the MCU 102 may read a designated area of the storage subsystem for messaging from a software agent. The software agent may write to the storage subsystem information relating to the last known good system state (as determined by the software agent). The MCU 102 may utilize the information relating to the last known good system state to validate the storage subsystem has not changed since that recordation. The validation may include comparing fields within the information against the current system state as written to the storage subsystem.

In another implementation, the control action may include MCU 102 sending attestation datum to the firmware 106. The MCU 102 may detect security issues from the sensors 104, including an unauthorized biometric scan, or an artifact from a software-based sensor action. The MCU 102 may include a real time clock and may use it to validate the clock of the firmware. In some security attacks, the system clock in the firmware may be altered. By comparing the MCU 102 first time record to a second time record of the firmware clock, the MCU 102 may take action. The first time record may be a time date stamp taken at a periodic interval as requested from an internal MCU real time clock. The second time record may be a time date stamp taken at the same or a similar periodic interval as requested from a real time clock accessible by the firmware, which may be different than the MCU real time clock. The periodic communication of time records to the MCU and firmware may attest to the validity and stability of both.

In another implementation, the control action may include disabling a communications port on the system. In an implementation including a peripheral sensor port, the MCU 102 may determine the control action includes evaluating a whitelist against a set of connected peripherals to the system. As describe previously, the evaluation may include evaluating a VID and a PID from the attached peripheral via the peripheral sensor port.

The MCU 102 executes the control action at block 206. The MCU 102 may take action based on the control action determined by the system-related datum. In this example, the MCU 102 may execute instructions that correspond with conditional logic based on the type of system-related datum received. If the control action corresponds to a heat or humidity data, the MCU 102 executes a control action corresponding to disabling changing the power state of the host system.

For a control action corresponding to a peripheral sensor detecting a peripheral interfacing with the host system, the MCU 102 may execute logic to compare the peripheral to a whitelist of acceptable peripherals.

The MCU 102 enables the system to enter a different power state at block 208. Upon the determination and execution of the control action, the MCU 102 may logically allow the system to enter a different power state. In the event the control action is indicative of a system security issue, the MCU 102 may only allow the system to change power states to a power state less than S0. In this implementation, the MCU 102 based on the control action, limits the power states to protect the host system, either from physical failure (e.g. heat, humidity, etc.) or logical failure (e.g. virus, unknown peripheral, etc.). When the power state moves from S5 to any power state less than S0, the host system including the firmware may boot into a "safe mode." The "safe mode" may not be a full operating system execution and may reside only with firmware UEFI interfaces to evaluate a reason why the system did not enter power state S0.

Figure 3:
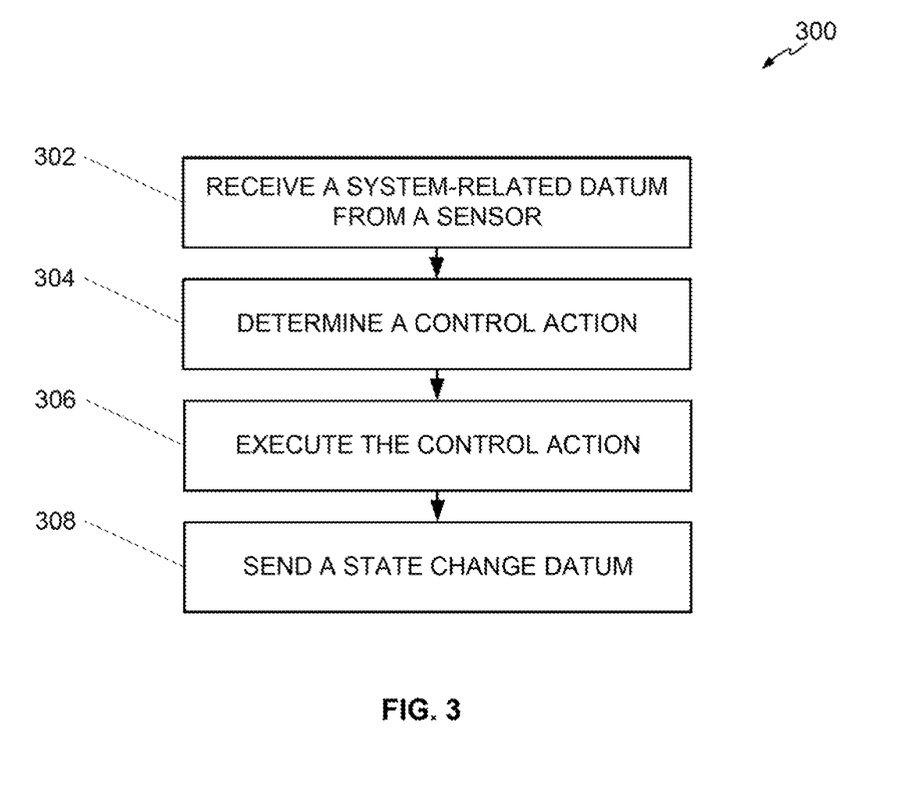
FIG. 3 is a computing device for supporting instructions for state control action, according to an example.

FIG. 3 is a computing device for supporting instructions for state control action, according to an example. Similar to FIG. 2, FIG. 3, may refer back to features of the system 100 in FIG. 1. FIG. 3 describes a system that utilizes the MCU 102 and the sensors 104 to change the operating mode of the host system.

The MCU 102 may receive a system-related datum from one of a plurality of sensors at block 302. In another implementation, the one of the plurality of sensors may include a biometric sensor. In other implementations one of the plurality of sensors may be a smart card. In this implementation, the system-related datum may be similar to those described in reference to FIG. 2.

The MCU 102 may determine a control action based on the system-related datum at block 304. In this implementation the control action may be similar to those described in reference to FIG. 2.

The MCU 102 may execute the control action on a system corresponding to the system-related datum at block 306. In this implementation, the control action may include messaging to the system 100 firmware 106. The control action may include instructions to change the operating state of the host system. In one implementation, the control action may include the MCU 102 updating a non-volatile memory address associated with a firmware setting to indicate a different operating mode. In one implementation, the MCU 102 may utilize a mapping system from the system-related datum to the control action. A mapping system may include a lookup table receiving a type of system-related datum as an input and determining a correlated control action as an output. For example, a system-related datum received from a temperature sensor may be looked up in a lookup table and mapped to an appropriate control action. The MCU 102 may internally have a ruleset to evaluate input system-related datum. The ruleset may be stored internally to the MCU 102. The ruleset may include threshold values for the respective mapped input system-related datum. The MCU 102 may match the system-related datum to a rule within the ruleset. In one implementation, the matching may correspond to a switch based on datum type or the type of sensor transmitting the datum or the system-related datum exceeding a threshold for the specific type of system-related datum. The MCU 102 utilizes the ruleset as a step in enforcing a policy. In one implementation, the mapping system may be extended to include more logic prior to the output of the control action. Upon doing the lookup into the lookup table of the mapping system, the MCU 102 may execute a set of conditional instructions to implement the policy. The conditional instructions may receive or extract additional information from the host system to determine how the control action should be determined. For example, the system-related datum includes a biometric fingerprint scan. The fingerprint scan is then mapped via the lookup table to a set of conditional instructions implementing the policy. The policy utilizes the biometric fingerprint scan in addition to user identification data from the host system to determine the appropriate control action. The policy may include changing a user session in the system. The MCU 102 then creates the control action based on the mapping.

The MCU 102 may send a state change datum to a firmware of the system wherein the state change datum indicates a state change of the system based on the control action at block 308. The state change datum may correspond to a firmware boot parameter. A firmware boot parameter may include a setting stored in non-volatile memory that the firmware can access and action on. For example, a firmware boot parameter may be a flag to disable a communication port on the host system. The state change datum may include a change in boot instruction. The MCU 102 may be communicatively or electrically connected to the firmware and thereby signals the firmware of a state change. The firmware re-reads its configuration from non-volatile memory and updates the system accordingly. This may include updating a boot sequence on a storage subsystem of the host system.

In one example of the system 100 described in the context of FIG. 3, the MCU 102 may receive a biometric input from a biometric sensor. In this example, the biometric input may be a system-related datum. The MCU 102 determines that the biometric input includes a notice that an unauthorized user has access the device. The MCU 102 determines a control action, which includes restarting the operating system in a less-privileged mode. The MCU 102 executes the control action to update the non-volatile memory of the firmware 106 to indicate a specific access or login profile. The specific access or the login profile are indicative of a change in user session of the system. The MCU 102 sends the firmware a state change datum including a notification that a state change has occurred. The firmware 106 may re-read that value and pass it to the operating system to change the operating state of the operating system. In this implementation, the user session corresponds to a restricted mode state of the system.

In another implementation, the MCU 102 may receive a global positioning system (GPS) input from a GPS sensor. In this example, the GPS input may be a system-related datum. The GPS input may include a physical location indicia. The MCU 102 compares the GPS input against a value stored internal to the MCU 102. The MCU 102 determines a control action based on the GPS input and the internal value not matching, indicating that the host system is not in the position originally intended. The MCU 102 executes the control action to update the non-volatile memory of the firmware 106 to indicate a specific operating mode. The MCU 102 sends the firmware a state change datum including a notification that an operating change has occurred. The firmware 106 may re-read that value and shutdown the system. In another implementation, where the GPS input and the internal value match, the operational change may allow the host system to operate in a specific configuration corresponding to the locations (e.g. Airport Kiosk).

Figure 4:
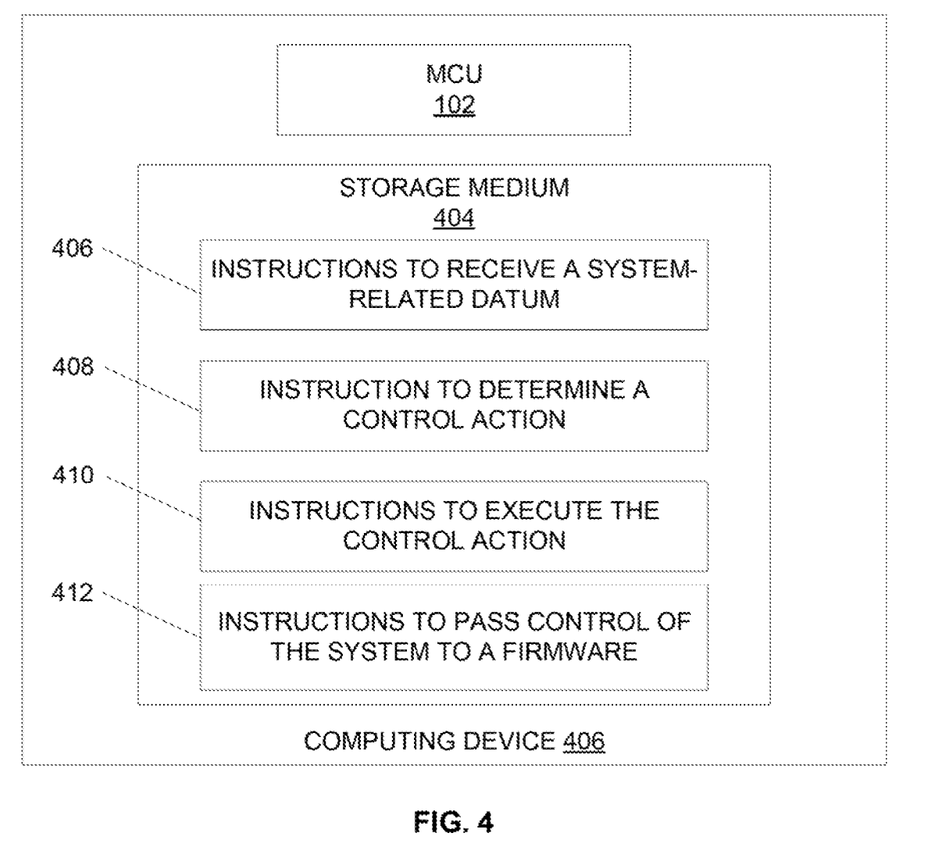
FIG. 4 is a block diagram corresponding to a method for controlling S5 power state, according to an example.

FIG. 4 is a computing device for supporting instructions for S5 power state control, according to an example. The computing device 400 depicts a MCU 102 and a storage medium 404 and, as an example of the computing device 400 performing its operations, the storage medium 404 may include instructions 406-412 that are executable by the MCU 102. The MCU 102 of FIG. 4 may be synonymous with the MCU 102 referenced in FIG. 1. The storage medium 404 can be said to store program instructions that, when executed by MCU 102, implement the components of the computing device 400.

The executable program instructions stored in the storage medium 404 include, as an example, instructions to receive a system-related datum from one of a plurality of sensors while a system corresponding to the system-related datum is in an S5 power state 406, instructions to determine a control action based on the system-related datum 408, instructions to execute the control action on the system 410, and instructions to pass control of the system, based on the control action, to a firmware of the system 412. In one implementation, the instructions may be said to implement the method as described in reference to FIG. 2.

Storage medium 404 represents generally any number of memory components capable of storing instructions that can be executed by MCU 102.

Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, MCU 102 represents any number of processors capable of executing instructions stored by storage medium 404. Further, storage medium 404 may be fully or partially integrated in the same device as MCU 102, or it may be separate but accessible to that computing device 400 and the MCU 102.

In one example, the program instructions 406-412 may be part of an installation package that, when installed, can be executed by MCU 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

Figure 5:
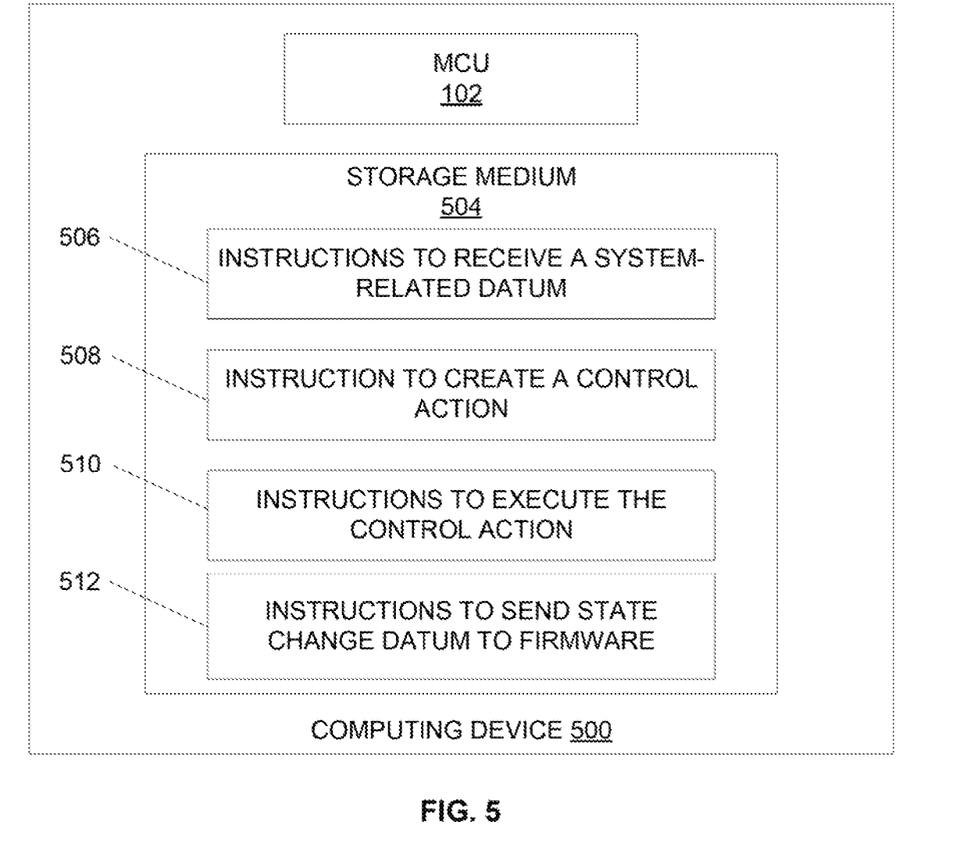
FIG. 5 is a computing device for supporting instructions for state control action, according to an example.

FIG. 5 is a computing device for supporting instructions for state control action, according to an example. The computing device 500 depicts a MCU 102 and a storage medium 504 and, as an example of the computing device 500 performing its operations, the storage medium 504 may include instructions 506-512 that are executable by the MCU 102. The MCU 102 of FIG. 4 may be synonymous with the MCU 102 referenced in FIG. 1. The storage medium 504 can be said to store program instructions that, when executed by MCU 102, implement the components of the computing device 500.

The executable program instructions stored in the storage medium 504 include, as an example, instructions to receive a system-related datum from one of the plurality of sensors 506, instructions to create a control action based on comparing the system-related datum against a ruleset 508, instructions to execute the control action on the system 510, and instructions to send an state change datum to a firmware wherein the state change datum indicates an operational change of the system based on the control action 512. In one implementation, the instructions may be said to implement the method as described in reference to FIG. 3.

Storage medium 504 represents generally any number of memory components capable of storing instructions that can be executed by MCU 102. Storage medium 504 is non-transitory in the sense that it does not encompass a transitory signal but instead is made up of at least one memory component configured to store the relevant instructions. As a result, the storage medium 504 may be a non-transitory computer-readable storage medium. Storage medium 504 may be implemented in a single device or distributed across devices. Likewise, MCU 102 represents any number of processors capable of executing instructions stored by storage medium 504. Further, storage medium 504 may be fully or partially integrated in the same device as MCU 102, or it may be separate but accessible to that computing device 500 and the MCU 102.

In one example, the program instructions 506-512 may be part of an installation package that, when installed, can be executed by MCU 102 to implement the components of the computing device 500. In this case, storage medium 504 may be a portable medium such as a CD, DVD, or flash drive, or a memory maintained by a server from which the installation package can be downloaded and installed. In another example, the program instructions may be part of an application or applications already installed. Here, storage medium 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:
1. A system comprising:
a plurality of sensors;
a microcontrol unit (MCU) communicatively coupled to the plurality of sensors to:
receive a system-related datum from one of the plurality of sensors, wherein the system-related datum includes information for a condition of the system;
determine a control action based on the system-related datum, wherein the control action includes an update to a boot sequence on a storage device of the system;
execute the control action on the system; and
send a state change datum to a firmware, wherein the state change datum indicates an operational change of the system based on the control action.

2. The system of claim 1, wherein the system-related datum comprises a physical location indicia of the system.

3. They system of claim 2, wherein the operational change comprises executing a set of boot instructions corresponding to the physical location indicia.

4. The system of claim 1, wherein the state change datum comprises a change in boot instruction.

5. The system of claim 1, wherein the condition is a software error of the system.

6. The system of claim 1, wherein the condition is an unapproved peripheral device interfacing with the system and wherein the system-related datum includes at least one of: a vendor identification field of the peripheral device or a product identification field of the peripheral device.

7. The system of claim 1, wherein the one of the plurality of sensors includes a temperature sensor and the system-related datum includes a temperature.

8. The system of claim 1, wherein the one of the plurality of sensors includes a humidity sensor and the system-related datum includes a humidity.

9. The system of claim 1, wherein the one of the plurality of sensors includes agent software executing on top of an operating system within the system, wherein the agent software detects system errors of the system.

10. The system of claim 1, wherein the system-related datum corresponds to at least one of: a physical condition of the system or a logical condition on the system.

11. The system of claim 1, wherein the condition includes an internal temperature of the system.

12. A method comprising:
    receiving a system-related datum from a biometric sensor, wherein the system-related datum corresponds to an unauthorized user accessing a system;
    determining a control action based on the system-related datum, wherein the control action includes restarting an operating system of the system in a restricted mode and updating a login profile based on the system-related datum;
    executing the control action on the system corresponding to the system-related datum; and
    sending a state change datum to a firmware of the system wherein the state change datum indicates an operational change of the system based on the control action.

13. The method of claim 12, wherein the state change datum comprises a change in a user session of the system.

14. The method of claim 13, wherein the user session corresponds to a restricted mode state of the system.

15. A non-transitory computer readable medium comprising instructions executable by a microcontrol unit (MCU) to:
    receive a system-related datum from one of the plurality of sensors, wherein the system-related datum includes information for a physical condition or a logical condition impacting the system;
    create a control action based on comparing the system-related datum against a ruleset, wherein the control action includes an update to a boot sequence on a storage device of the system;
    execute the control action on the system; and
    send a state change datum to a firmware wherein the state change datum indicates an operational change of the system based on the control action.

16. The medium of claim 15 the instructions executable by an MCU to execute a control action further comprising:
    matching the system-related datum to the ruleset;
    mapping the ruleset to a policy; and
    creating the control action based on the mapping.

17. The medium of claim 16 wherein the state change datum corresponds to a firmware boot parameter.

* * * * *